United States Patent [19]
Depledge et al.

[11] Patent Number: 5,899,988
[45] Date of Patent: May 4, 1999

[54] BITMAPPED INDEXING WITH HIGH GRANULARITY LOCKING

[75] Inventors: Michael Depledge, San Jose; Jeffrey I. Cohen, Sunnyvale; Hakan Jakobsson, San Francisco; Mark Kremer, Sunnyvale; Cetin Ozbutun, San Carlos; Quoc Tai Tran, Redwood Shores; Alexander C. Ho, Belmont, all of Calif.

[73] Assignee: Oracle Corporation, Redwood Shores, Calif.

[21] Appl. No.: 08/807,451

[22] Filed: Feb. 28, 1997

[51] Int. Cl.$^6$ .................................................. G06F 17/30
[52] U.S. Cl. ........................... 707/3; 707/10; 707/7; 707/202
[58] Field of Search ............................ 707/3, 10, 7, 202

[56] References Cited

U.S. PATENT DOCUMENTS

| | | | |
|---|---|---|---|
| 5,241,625 | 8/1993 | Epard et al. | 395/163 |
| 5,495,608 | 2/1996 | Antoshenkov | 707/10 |
| 5,560,007 | 9/1996 | Thai | 707/3 |
| 5,619,631 | 4/1997 | Schott | 395/140 |
| 5,649,181 | 7/1997 | French et al. | 707/3 |
| 5,694,148 | 12/1997 | Cahill, III | 345/127 |
| 5,710,915 | 1/1998 | McElhiney | 707/3 |

OTHER PUBLICATIONS

"SQL *TextRetrieval Administrator's Guide", Version 2.0, Oracle Corporation, Rev. Jul., 1992 (Part No. 0365-20-0792).

Patrick O'Neil and Goetz Graefe, "Multi–Table Joins Through Bitmapped Join Indices", SIGMOD Record, vol. 24, No. 23, Sep. 1995.

IOUW wrap-up (vendors introduce database tools at International Oracle Users Week conference) (Client/server Connection) (Industry Trend or Event) DBMS, v8 n13, p. 112(1), Dec. 1995.

"Oracle TextServer3 Concepts, Version 3," Oracle Corporation (Part No. A24984–1, 1995, pp. 3–1 to 3–23).

"Oracle Textserver3 Concepts, Release 3.1," Oracle Corporation (Part No. A41697–2), 1996, pp. 3–1 to 3–29.

*Primary Examiner*—Wayne Amsbury
*Assistant Examiner*—Shahid Alam
*Attorney, Agent, or Firm*—McDermott, Will & Emery

[57] ABSTRACT

A method and apparatus provide bitmapped indexing with high granularity locking. Whenever a change is made to a data table upon which a bitmapped index is based, two differential entries are generated and stored as index entries in the bitmapped index. Each differential entry identifies a bit to be flipped in the corresponding bitmap index entry. When applied to corresponding bitmap index entry, the changes are reflected in the appropriate bitmaps. Whenever a bitmap is read from the bitmapped index, any corresponding differential entries are applied so that the resulting bitmap reflects the change made to the data table.

27 Claims, 7 Drawing Sheets

FIG. 1
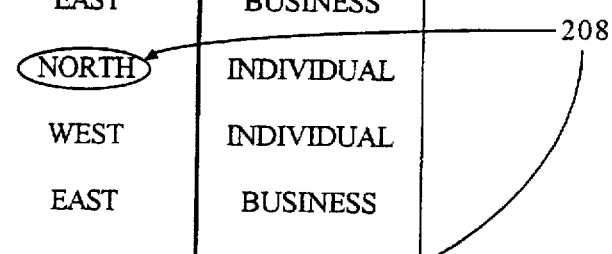
FIG. 2A
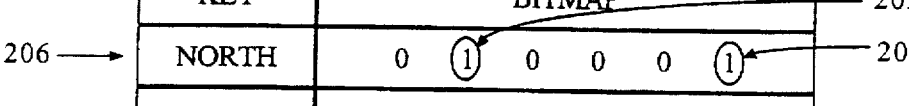
FIG. 2B
BITMAPPED INDEX FOR TYPE -- 250
| KEY | BITMAP | | | | | |
|---|---|---|---|---|---|---|
| BUSINESS | 1 | 0 | 0 | 1 | 1 | 0 |
| INDIVIDUAL | 0 | 1 | 1 | 0 | 0 | 1 |

FIG. 3

QUERY TABLE FOR BUSINESS CUSTOMERS
LOCATED IN EAST OR SOUTH -- 300

| TYPE = 'BUSINESS' | 1 0 0 1 1 0 |
| --- | --- |
| AND | AND |
| LOCATION = 'EAST' | 1 0 0 1 0 0 |
| OR | OR |
| LOCATION = 'SOUTH' | 0 0 0 0 1 0 |
| | = |
| | 1 0 0 1 1 0 |
| | AND |
| | 1 0 0 1 1 0 |
| | = |
| RESULT | ( 1 0 0 1 1 0 ) ←— 302 |

FIG. 5

DATA TABLE 500

| CUSTOMER # | LOCATION | TYPE |
|---|---|---|
| 101 | EAST | BUSINESS |
| 102 | NORTH | INDIVIDUAL |
| 103 | WEST | INDIVIDUAL |
| 104 | EAST | BUSINESS |
| 105 | SOUTH | BUSINESS |
| 106 | NORTH | INDIVIDUAL |

FIG. 6A

BITMAPPED INDEX FOR LOCATION -- 600

| KEY | SRID | ERID | BITMAP |
|---|---|---|---|
| NORTH | 1 | 6 | 0 1 0 0 0 1 |
| SOUTH | 1 | 6 | 0 0 0 0 1 0 |
| EAST | 1 | 6 | 1 0 0 1 0 0 |
| WEST | 1 | 6 | 0 0 1 0 0 0 |

FIG. 6B

BITMAPPED INDEX FOR TYPE -- 650

| KEY | SRID | ERID | BITMAP |
|---|---|---|---|
| BUSINESS | 1 | 6 | 1 0 0 1 1 0 |
| INDIVIDUAL | 1 | 6 | 0 1 1 0 0 1 |

FIG. 7

DATA TABLE -- 500

| CUSTOMER # | LOCATION | TYPE |
|---|---|---|
| 101 | EAST | BUSINESS |
| 102 | NORTH ~504 | INDIVIDUAL |
| 103 | ~~WEST~~ → SOUTH | INDIVIDUAL |
| 104 | EAST | BUSINESS |
| 105 | SOUTH | BUSINESS |
| 106 | NORTH | INDIVIDUAL |

FIG. 8

BITMAPPED INDEX FOR LOCATION -- 600

| | KEY | SRID | ERID | BITMAP |
|---|---|---|---|---|
| 602 → | NORTH | 1 | 6 | 0 (1) 0 0 0 1  — 604 |
| 602 → | SOUTH | 1 | 6 | 0 0 (0) 0 1 0  — 606 |
| DIFFERENTIAL ENTRY 610 → | SOUTH | (3) | NULL | NULL |
| 602 → | EAST | 1 | 6 | 1 0 0 1 0 0  — 608 |
| 602 → | WEST | 1 | 6 | 0 0 (1) 0 0 0 |
| DIFFERENTIAL ENTRY 612 → | WEST | (3) | NULL | NULL |

DIFFERENTIAL ENTRY -- 610, 612

| KEY | SRID | NULL | NULL |
|---|---|---|---|

BITMAPPED INDEXING WITH HIGH GRANULARITY LOCKING

RELATED APPLICATIONS

The present application is related to: U.S. patent application Ser. No. 08/807,344, entitled "CREATING BITMAPS FROM MULTI-LEVEL IDENTIFIERS", now pending, filed by Cetin Ozbutun, Michael Depledge, Hakan Jakobsson, Mark Kremer, Jeffrey I. Cohen, Quoc Tai Tran, and Alexander C. Ho on the equal day herewith, the contents of which are incorporated herein by reference.

U.S. Pat. application Ser. No. 08/808,584, entitled "BITMAP SEGMENTATION", now pending, filed by Cetin Ozbutun, Jeffrey I. Cohen, Hakan Jakobsson, Mark Kremer, Michael Depledge, Quoc Tai Tran, Alexander C. Ho, and Julian Hyde, on the equal day herewith, the contents of which are incorporated herein by reference.

U.S. patent application Ser. No. 08/752,188, entitled "METHOD AND APPARATUS FOR PROCESSING COUNT STATEMENTS IN A DATABASE SYSTEM", now U.S. Pat. No. 5,819,256 filed by Cetin Ozbutun, Michael Depledge, Hakan Jakobsson, and Jeffrey I. Cohen, on Nov. 20, 1996, the contents of which are incorporated herein by reference.

U.S. patent application Ser. No. 08/808,097, entitled "GROUP BY AND DISTINCT SORT ELIMINATION USING COST-BASED OPTIMIZATION", U.S. Pat. No. 5,822,748 filed by Jeffrey Ira Cohen, Cetin Ozbutun, Michael Depledge, and Hakan Jakobsson, on the equal day herewith, the contents of which are incorporated herein by reference.

U.S. patent application Ser. No. 08/808,096, entitled "METHOD AND APPARATUS FOR USING INCOMPATIBLE TYPES OF INDEXES TO PROCESS A SINGLE QUERY", now pending, filed by Jeffrey Ira Cohen, Cetin Ozbutun, Hakan Jakobsson, and Michael Depledge, on the equal day herewith, the contents of which are incorporated herein by reference.

U.S. patent application Ser. No. 08/808,094 entitled "INDEX SELECTION FOR AN INDEX ACCESS PATH", now pending, filed by Hakan Jakobsson, Michael Depledge, Cetin Ozbutun, and Jeffrey I. Cohen, on the equal day herewith, the contents of which are incorporated herein by reference.

U.S. patent application Ser. No. 08/808,585, entitled "QUERY PROCESSING USING COMPRESSED BITMAPS", now pending, filed by Cetin Ozbutun, Jeffry I. Cohen, Michael Depledge, Julian Hyde, Hakan Jakobsson, Mark Kremer, and Quoc Tai Tran, on the equal day herewith, the contents of which are incorporated herein by reference.

U.S. patent application Ser. No. 08/808,585, entitled "UPDATING BITMAPPED INDEXES", now pending, filed by Michael Depledge, Eakan Jakobsson, Cetin Ozbutun, Jeffrey I. Cohen, and Quoc Tai Tran, on the equal day herewith, the contents of which are incorporated herein by reference.

U.S. patent application Ser. No. 08/808,560, entitled "BITMAP INDEX COMPRESS", now pending, filed by Jeffrey I. Cohen, Michael Depledge, Hakan Jakobsson, Mark Kremer, Cetin Ozbutin, and Quoc Tai Tran, on the equal day herewith, the contents of which are incorporated herein by reference.

U.S. patent application Ser. No. 08/808,586, entitled "COMBINING BITMAPS WITHIN A MEMORY LIMIT", now pending, filed by Cetin Ozbutun, Jeffry I. Cohen, Michael Depledge, Julian Hyde, Hakan Jakobsson, Mark Kremer, and Quoc Tai Tran, on the equal day herewith, the contents of which are incorporated herein by reference.

FIELD OF THE INVENTION

The present invention relates to database systems, and more specifically, to a method and apparatus for implementing bitmapped indexing with high granularity locking.

BACKGROUND OF THE INVENTION

When compared to some of the many indexing schemes, such as binary tree (B-Tree) indexing and hash cluster indexing, bitmapped indexing provides favorable performance and storage characteristics, particularly for multiple predicate (condition) queries on low cardinality (few possible values) data. Logical operations performed using bitmapped indexes can be extremely efficient because they are amenable to machine level operations. On the other hand, relative to some other indexing schemes, bitmapped indexes require very little space. For example, under some circumstances, a single bitmapped index entry can contain the equivalent of thousands of B-Tree entries.

Consider the data table 100 illustrated in FIG. 1. Data table 100 consists of intersecting columns and rows which form a matrix of cells. Each of the three columns contains a type of customer data consisting of either CUSTOMER#, LOCATION, or TYPE, while each row contains all of the data for a particular customer. CUSTOMER# is a unique number and therefore (for a large number of customers) is a high cardinality data type. On the other hand, the LOCATION data type has only four possible values (NORTH, SOUTH, EAST, WEST) and is therefore a low cardinality data type. Similarly, the TYPE data type has only two possible values (BUSINESS, INDIVIDUAL), also making this data type a low cardinality data type.

FIG. 2A illustrates the index entries of a bitmapped index 200 for data type LOCATION of data table 100. Each index entry in bitmapped index 200 corresponds to one of the four possible values (key value) for the data type LOCATION and includes both the key value and a bitmap. Each bitmap contains a string of bits, with each bit (left to right) corresponding to a specific row (top to bottom) in the LOCATION column of the data table 100. A bit value of "1" indicates that the cell at the intersection of the LOCATION column and the row to which that bit corresponds in data table 100 contains the key value for that bitmapped index entry, while a "0" indicates that the cell does not contain the key value for that bitmapped index entry.

For example, the second bit 202 and the sixth bit 204 in the bitmap of the first entry 206 of bitmapped index 200 are both "1"s, indicating that the rows 208 in data table 100 (the second and sixth rows) contain the value NORTH under the LOCATION column. Since all remaining bits in the bitmap of the first entry 206 are "0"s, none of the remaining rows under the LOCATION column in data table 100 contain the value NORTH.

FIG. 2B illustrates the index entries of a bitmapped index 250 for TYPE based upon data table 100. Since the data type TYPE only has two possible values, (BUSINESS, INDIVIDUAL), bitmapped index 250 only contains two index entries.

A bitmapped index could also be easily generated for CUSTOMER#. However, such a bitmapped index would require six index entries, one for each possible value of CUSTOMER# and consequently would not be very efficient.

Nevertheless, based upon the size of bitmapped indexes 200, 250 for LOCATION and TYPE respectively, bitmapped indexes for low cardinality data require little storage space.

Turning now to FIG. 3 which illustrates a query table 300 for business customers (TYPE='BUSINESS') located in either the EAST or SOUTH (LOCATION='EAST' OR 'SOUTH'). Each entry (row) in query table 300 is obtained directly from bitmapped indexes 200, 250 for LOCATION and TYPE, respectively, as indicated on the left hand side of query table 300. The result 302 is easily and quickly determined using low-level (AND/OR), highly efficient logic. Other queries may be similarly processed so long as a complete bitmapped index is available for, and accurately reflects, each data type in the underlying data table.

Despite the favorable performance and storage characteristics of bitmapped indexes, they are not without their disadvantages. Bitmapped indexes are only useful if they accurately reflect the data upon which they are based. Consequently, whenever a data table is changed, all bitmapped indexes based upon that data table must be updated to reflect the change to the data table.

Updating a bitmapped index can require substantial system resources since the appropriate bitmaps must be loaded into volatile memory, updated and then written back out to disk. Since each bitmap contains one bit for every row in the corresponding data table, updating bitmaps for large data tables can require significant amounts of memory and processing power. Moreover, a large amount of UNDO (undo update) and REDO (recovery) information must be maintained. For example, referring to data table 100 (FIG. 1), a change of the location of CUSTOMER# 101 from EAST to WEST affects the index entries in bitmapped index 200 (FIG. 2A) for the key values EAST and WEST. Consequently, to update bitmapped index 200, the bitmaps in both the EAST and WEST index entries must be loaded into memory, the left most bit of each bitmap flipped, and then the updated bitmaps are written to disk. Although each bitmap in bitmapped index 200 only contains six bits, corresponding to each of the six rows in data table 100, other data tables may have thousands or hundreds of thousands of rows, requiring each corresponding bitmap to also have thousands or hundreds of thousands of bits. Updating bitmaps containing thousands or hundreds of thousands of bits can require substantial system resources.

For ready-only, read-mostly or warehousing environments, the underlying data is changed infrequently enough to minimize the frequency of bitmapped index rebuilds. However, for high OLTP (online transaction processing) environments or other environments involving frequent insert, update and delete operations, the high frequency of bitmapped index rebuilds can significantly reduce system performance.

In addition to adversely affecting system performance, rebuilding a bitmapped index can adversely affect data concurrency in multi-user systems. Since each entry in a bitmapped index covers many data blocks in the data table upon which the bitmapped index is based, many rows in the data table must be locked (low granularity locking) while the bitmapped index entry is being updated so that additional changes cannot be made to any of the rows indexed by the bitmapped index entry during the update. As a result, while a bitmapped index is being updated, no other users can make changes to the data table, resulting in low data concurrency.

In view of the burdens placed on system resources and the adverse effects on data concurrency discussed above, a method and apparatus for implementing bitmapped indexing with minimal effects on system resources while providing high data concurrency through high granularity locking is highly desirable.

SUMMARY OF THE INVENTION

According to one aspect of the present invention, a method is provided for allowing a bitmapped index to reflect a change made to data associated with the bitmapped index. First, a change entry is generated to identify a bitmap change which, when applied to a bitmap contained in the bitmapped index, causes the bitmap to reflect the change made to the data. Then, the change entry is saved.

According to another aspect of the present invention, a computer system having a storage medium with an index stored thereon is provided. The index includes a first set of index entries of a first type and a second set of index entries of a second type. The second set of index entries specify changes to the first set of index entries to make the first set of index entries reflect changes made to data upon which the index is based.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates a data table;

FIG. 2A illustrates a bitmapped index for the data type LOCATION contained in the data table illustrated in FIG. 1;

FIG. 2B illustrates a bitmapped index for the data type TYPE contained in the data table illustrated in FIG. 1;

FIG. 3 is a query table for a query based upon the data table illustrated in FIG. 1;

FIG. 5 illustrates a second data table;

FIG. 6A illustrates a bitmapped index for the data type LOCATION contained in the second data table illustrated in FIG. 5;

FIG. 6B illustrates a bitmapped index for the data type TYPE contained in the second data table illustrated in FIG. 5;

FIG. 7 illustrates a change made to the second data table illustrated in FIG. 5;

FIG. 8 illustrates a change made to the bitmapped index illustrated in FIG. 6A according to an embodiment of the present invention;

FIG. 9 illustrates the contents of a differential entry according to an embodiment of the present invention;

DETAILED DESCRIPTION OF THE PREFERRED EMBODIMENT

A method and apparatus for providing bitmapped indexing with high granularity locking is described. In the following description, for the purposes of explanation, numerous specific details are set forth in order to provide a thorough understanding of the present invention. It will be apparent, however, that the present invention may be practiced without these specific details. In other instances, well-known structures and devices are illustrated shown in block diagram form in order to avoid unnecessarily obscuring the present invention.

HARDWARE OVERVIEW

Figure 4:
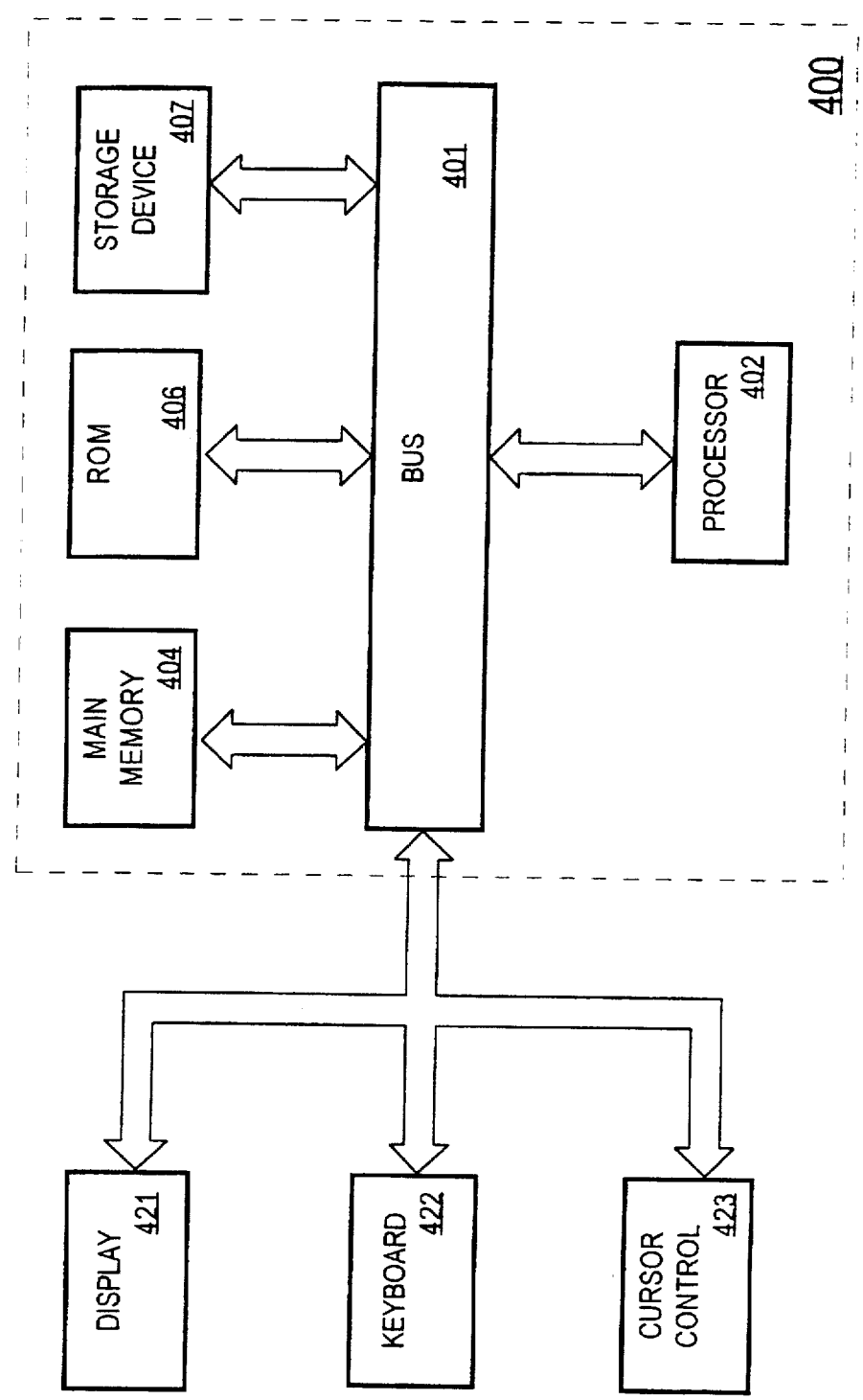
FIG. 4 is a block diagram of a computer system on which the present invention may be implemented.

FIG. 4 illustrates a block diagram of a computer system 400 upon which an embodiment of the present invention may be implemented. Computer system 400 includes a bus 401 or other communication mechanism for communicating information, and a processor 402 coupled with bus 401 for processing information. Computer system 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computer system 400 also includes a read only memory (ROM) and/or other static storage device 406 coupled to bus 401 for storing static information and instructions for processor 402. A data storage device 407, such as a magnetic disk or optical disk, is coupled to bus 401 for storing information and instructions.

Computer system 400 may also be coupled via bus 401 to a display device 421, such as a cathode ray tube (CRT), for displaying information to a computer user. An alphanumeric input device 422, including alphanumeric and other keys, is typically coupled to bus 401 for communicating information and command selections to processor 402. Another type of user input device is cursor control 423, such as a mouse, a trackball, or cursor direction keys for communicating direction information and command selections to processor 402 and for controlling cursor movement on display 421. This input device typically has two degrees of freedom in two axes, a first axis (e.g., x) and a second axis (e.g., y), which allows the device to specify positions in a plane.

Alternatively, other input devices such as a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 422 wherein all interface is provided via the stylus as a writing instrument (like a pen) and the written text is interpreted using optical character recognition (OCR) techniques.

The present invention is related to the use of computer system 400 to provide bitmapped indexing with high granularity locking. According to one embodiment, bitmapped indexing with high granularity locking is provided by computer system 400 in response to processor 402 executing sequences of instructions contained in memory 404. Such instructions may be read into memory 404 from another computer-readable medium, such as data storage device 407. Execution of the sequences of instructions contained in memory 404 causes processor 402 to perform the process steps that will be described hereafter. In alternative embodiments, hard-wired circuitry may be used in place of or in combination with software instructions to implement the present invention. Thus, the present invention is not limited to any specific combination of hardware circuitry and software.

FUNCTIONAL OVERVIEW

The present invention provides a method and apparatus for implementing bitmapped indexing with high granularity locking. In general, whenever a change is made to data upon which a bitmapped index is based, a special type of index entry, referred to herein as a differential entry, is generated and stored in the bitmapped index. Then, whenever an index entry is read from the bitmapped index, any differential entries associated with that index entry are applied to the bitmap contained in the index entry to obtain a resulting bitmap which reflects the change previously made to the data.

FIG. 5 illustrates a data table 500 containing customer information which is identical to the customer information contained in data table 100 of FIG. 1. FIG. 6A illustrates a bitmapped index 600 built on the LOCATION key in data table 500 and includes four index entries 602. Each index entry 602 corresponds to one of the four possible values (NORTH, SOUTH, EAST, WEST) of the data type LOCATION.

According to one embodiment of the present invention each index entry 602 includes a key, a starting row identifier (SRID), an ending row identifier (ERID) and a bitmap, as indicated by the column headings. The key contains one of the four possible values (NORTH, SOUTH, EAST or WEST) for LOCATION. The SRID and ERID data types support segmented tables by identifying a range of rows in data table 500 to which a particular index entry 602 applies. In bitmapped index 600, each index entry 602 contains a SRID value of "1" and an ERID value of "6", indicating that each index entry 602 covers all six rows in data table 500. However, the bitmaps used to index very large data tables, perhaps containing thousands of bits, may be divided into several bitmap segments which are stored in separate index entries.

Each bitmap contains a string of bits corresponding to the rows in data table 500 within the range indicated by the SRID and ERID values within the index entry 602 containing the bitmap. Each bit in the bitmap corresponds to a specific row within the covered range and indicates whether the corresponding row contains that particular key value contained in the index entry 602. For example, the second bit 604 in the bitmap of the first index entry 602 of bitmapped index 600 indicates that the second row (SRID+1) in data table 500 contains the key value NORTH in the LOCATION column.

FIG. 6B illustrates a bitmapped index for TYPE 650 which conforms to the same format as just described for the bitmapped index 600 for LOCATION in FIG. 6A.

GENERATING AND STORING DIFFERENTIAL RECORDS

According to an embodiment of the present invention, whenever a change is made to data table 500, differential entries are generated and stored in bitmapped indexes 600, 650. Each differential entry specifies a change to bitmap information contained in bitmapped indexes 600, 650 which, when applied to the bitmap information, causes the bitmap information to reflect the change to data table 500.

The generation and storage of differential entries is described with reference to FIGS. 6A, 7, 8 and 9. As illustrated in FIG. 7, a change is made to the location of customer#103 in data table 500 from WEST to SOUTH, as indicated by reference numeral 504. Based upon change 504, bitmapped index 600 no longer accurately reflects data table 500 and cannot be used for query processing. Specifically, the third bit 606 in the bitmap of index entry 602 for the key SOUTH is a "0" which, based upon change 504, should now be a "1", since the LOCATION column in the third row of data table 500 now contains the key value SOUTH. Similarly, the third bit 608 in the bitmap of index entry 602 for the key WEST is still a "1" which, based upon change 504, should new be a "0", sine the LOCATION column in the third row of data table 500 no longer contains the key value WEST.

As illustrated in FIG. 8, two differential entries 610, 612 are generated and stored in bitmapped index 600. Differential entry 610 is stored immediately following the index entry 602 for the key value WEST while differential entry 612 is stored immediately following the index entry 602 for the key value SOUTH.

As illustrated in FIG. 9, the type of data contained in differential entries 610, 612 is identical to the contents of index entries 602. However, differential entries 610, 612 must be readily identifiable so that they may be applied during query processing as described in more detail below. According to one embodiment of the present invention, differential entries 610, 612 always contain NULL values for both the ERID and bitmap fields to distinguish them from other index entries 602. The NULL values in the ERID and bitmap fields are any values which, alone or in combination, uniquely identify a index entry 602 as a differential entry 610, 612.

In addition to storing a NULL value in both the ERID and bitmap fields in differential entries 610, 612, the SRID field in differential entries 610, 612 contains the information necessary to update its corresponding index entry 602 so that the index entry 602 reflects the change made to data table 500. Specifically, in differential entries 610, 612 the SRID field is used to identify the specific bit in the bitmap of the corresponding index entry 602 which needs to be flipped for that index entry 602 to accurately reflect the change made to data table 500.

For example, as illustrated in FIG. 8, differential entry 610 contains a SRID value 614 of three, indicating that the third bit 606 in the bitmap of the preceding index entry 602 for the key value SOUTH must be flipped, in this case from a "0" to a "1", for the index entry 602 for the key value SOUTH to accurately reflect the change 504 made to data table 500. Similarly, differential entry 612 contains a SRID value 616 of three, indicating that the third bit 608 in the bitmap of the index entry 602 for the key value WEST must be flipped, in this case from a "1" to a "0", for that index entry 602 to accurately reflect change 504 made to data table 500.

Figure 10:
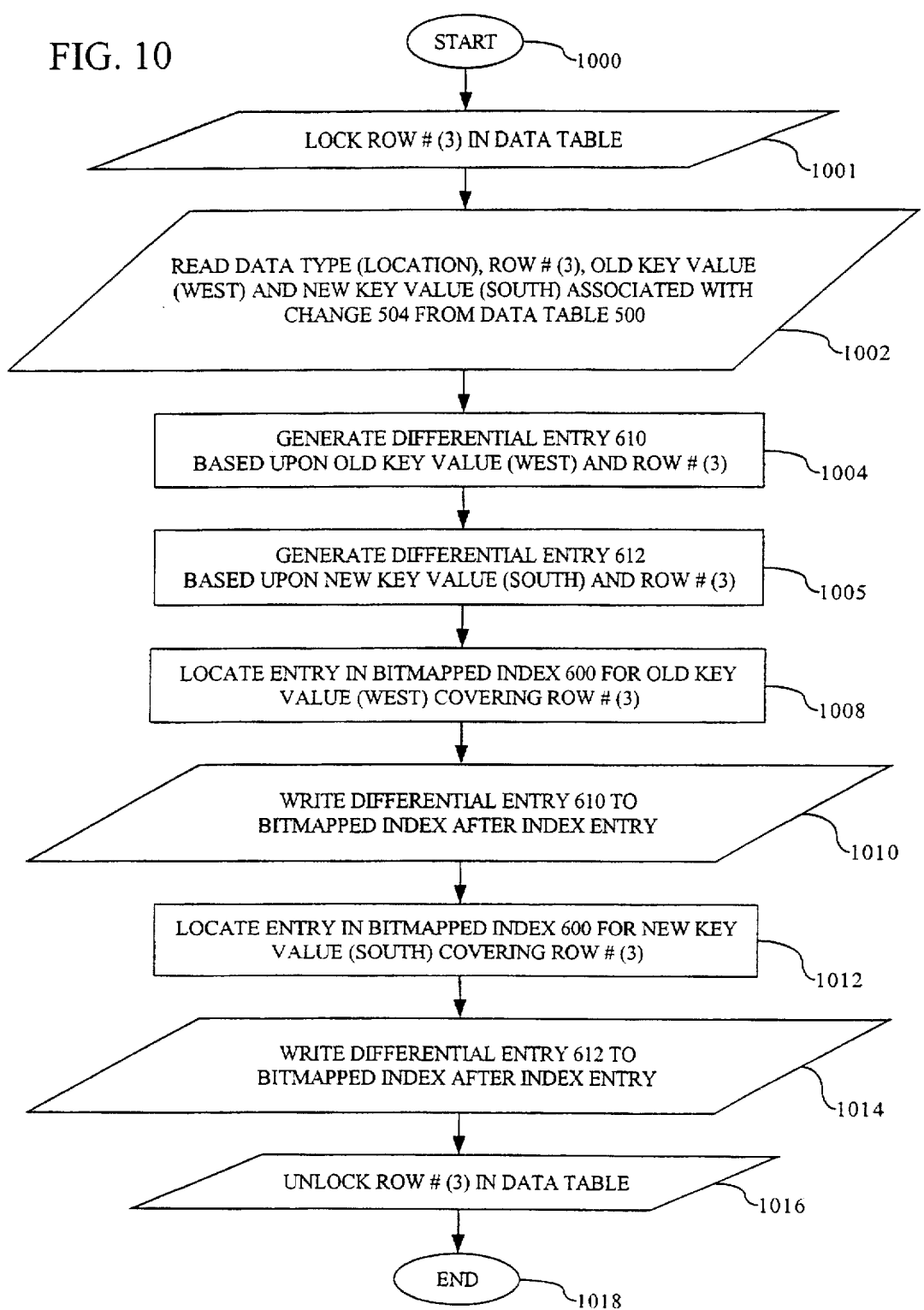
FIG. 10 is a flow chart illustrating a method for generating and storing a differential entry according to an embodiment of the present invention.

FIG. 10 is a flow chart illustrating the steps for generating and storing differential entries 610, 612 (FIG. 8) according to an embodiment of the present invention. The process is started in step 1000 when change 504 (FIG. 7) is made to data table 500. In step 1001 the third row in data table 500, where change 504 was made, is locked so that other processes cannot make further updates to the third row of data table 500 while differential entries 610, 612 are being generated and stored in bitmapped index 600. In step 1002, the data type (LOCATION), row number (3), old key value (WEST) and new key value (SOUTH) associated with change 504 are read from data table 500.

In step 1004 differential entry 610 is generated based upon the old key value (WEST) and row number (3). In step 1005, differential entry 612 is generated based upon the new key value (SOUTH) and row number (3).

In step 1008, bitmapped index 600 is searched to locate the index entry 602 for the old key value (WEST) covering the row number (3). Differential entry 610 is then written into bitmapped index 600 immediately after this index entry 602 in step 1010.

In step 1012, bitmapped index 600 is searched to locate the index entry 602 for the new key value (SOUTH) covering the row number (3). Differential entry 612 is then written into bitmapped index 600 immediately after this index entry 602 in step 1014. In step 1016 the lock on the third row of data table 500 is released so that other processes may make changes to that row. The process is then complete in step 1018.

Although differential entries 610, 612 have been described as having a key, SRID, ERID and bitmap, other formats may be used without departing from the scope of the present invention so long as differential entries 610, 612 are readily identifiable and specify changes to be made to the corresponding index entries 602 to reflect changes made to data table 500.

In addition, although the present invention has been described with respect to a single change 504 made to data table 500, the present invention is equally applicable to multiple changes made to data table 500. However, according to an embodiment of the present invention, duplicate differential entries 610, 612 are not allowed. If, during the storing of a differential entry 610, 612 to bitmapped index 600, an identical differential entry 610, 612 already exists, then the new differential entry 610, 612 is not used and the existing differential entry 610, 612 is deleted from bitmapped index 600 to reflect the change to data table 500. As a result, each index entry 602 may have as many differential entries 610,612 as there are bits in the bitmap contained in the index entry 602.

If the number of differential entries 610, 612 increases to where applying the differential entries 610, 612 during query processing has a significant adverse effect upon query processing performance then those index entries 602 having large numbers of associated differential entries can be regenerated and the differential entries deleted.

APPLYING DIFFERENTIAL RECORDS DURING QUERY PROCESSING

According to another aspect of the present invention, whenever an index entry is read from a bitmapped index during query processing, all differential entries associated with that index entry are applied to that index entry so that the results of the query on that index entry will reflect all changes made to the data upon which the bitmapped index is based.

Figure 11:
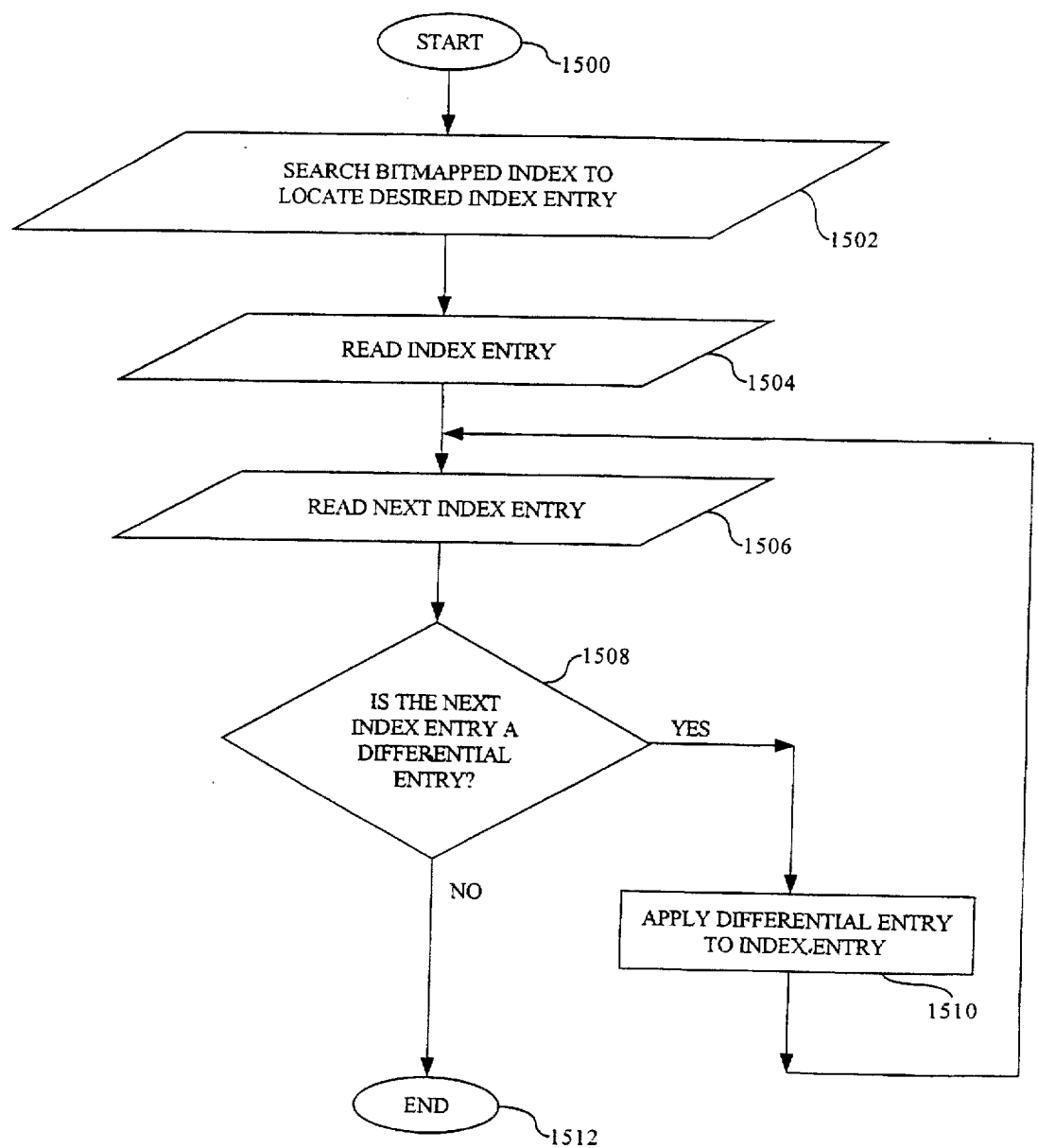
FIG. 11 is a flow chart illustrating a method for applying a differential entry according to an embodiment of the present invention.

The steps for applying differential entries during query processing according to an embodiment of the present invention are described with reference to FIGS. 7 and 8 and a flow chart illustrated in FIG. 11.

After starting in step 1500, a index entry 602 contained in bitmapped index 600 is located based upon the query in step 1502. The index entry 602 is then read from bitmapped index 600 in step 1504.

After reading the desired index entry 602 in step 1504, bitmapped index 600 is searched to locate any differential entries associated with this index entry 602. Since any differential entries 610, 612 for this index entry 602 would immediately follow index entry 602 in bitmapped index 600, the next index entry 602 is read in step 1506 and in step 1508 a determination is made as to whether that index entry 602 is a differential entry. As previously discussed, this is accomplished by examining the contents of both the ERID and bitmap fields of the index entry 602 to determine whether both fields contain a NULL value. If both the ERID and bitmap fields contain a NULL value then the index entry 602 is a differential entry. Otherwise, the index entry 602 is not a differential entry.

If in step 1508 it is determined that the next index entry 602 is a differential entry, then in step 1510, the differential entry is applied to the index entry 602. As previously discussed, applying a differential entry involves changing the state of the bit specified by the SRID field in the differential entry in the bitmap of the previously read index entry 602. Once the differential entry has been applied to the index entry 602, then in step 1506, the next index entry 602 is read and again in step 1508, a determination made as to whether this index entry 602 is a differential entry. If the next index entry 602 is also a differential entry, then in step 1510 this differential entry is also applied to index entry 602. All remaining differential entries associated with index entry 602 are applied to index entry 602 according to steps 1506, 1508 and 1510 until a determination is made in step 1508 that no more differential entries exist for this index entry 602. Once all differential entries have been applied, then the bitmap adjustment process is complete in step 1512 and the resulting bitmap may be used to process the query. This approach ensures that the query result reflects all changes made to data table 500.

The use of differential entries in bitmapped indexes to reflect changes made to data upon which the bitmapped index is based has several advantages over prior approaches. First, the burden placed on system resources is minimized since the bitmaps affected by the change do not have to be updated. Entire bitmap segments no longer have to be read into memory, updated to reflect the change to the data table and then written to disk. Also, copies of the updated bitmap segments do not have to be maintained in the redo and undo (recovery) logs. Instead, system resources only need to generate differential entries which require little processing to generate and little space to store.

Further, the use of differential entries allows a finer granularity of locking. Specifically, entire bitmaps are not updated in response to updates to data. Therefore, only the data (e.g., the row) that is actually being updated must be locked. Since only the individual row in the data table where the change was made needs to be locked, other users may access all other rows in the data table while the differential entries are generated and stored in the bitmapped index. Consequently, the method and apparatus for implementing bitmapped indexing according to the present invention is ideally suited for high OLTP environments or any other environment where multiple individual changes are made to data tables.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for allowing a bitmapped index to reflect a change made to data associated with the bitmapped index, the method comprising the steps of:

a) generating a change entry identifying a bitmap change which, when applied to a bitmap contained in the bitmapped index, causes the bitmap to reflect the change made to the data; and b) saving the change entry.

2. The method of claim 1, wherein the step of saving the change entry includes the step of storing the change entry as an index entry in the bitmapped index.

3. The method of claim 1, further comprising the steps of a) when a first bitmap associated with the prior value of the changed data is read from the bitmapped index, applying the bitmap change to the first bitmap causing the first bitmap to reflect the change made to the data, and b) when a second bitmap associated with the new value of the changed data is read from the bitmapped index, applying the bitmap change to the second bitmap causing the second bitmap to reflect the change made to the data.

4. The method of claim 3, wherein the step of applying the bitmap change to the first bitmap further comprises the step of flipping a bit in the first bitmap specified in the bitmap change causing the first bitmap to indicate that the changed data no longer contains the value associated with the first bitmap, and wherein the step of applying the bitmap change to the second bitmap further comprises the step of flipping a bit in the second bitmap specified in the bitmap change causing the second bitmap to indicate that the changed data contains the value associated with the second bitmap.

5. The method of claim 1, wherein the data is a data table, the change includes changing an old value to a new value in the data table and, the method further comprises the steps of:

a) when the old value is changed to the new value
  i) generating a first change entry specifying a change to a first bitmap in the bitmapped index, the first bitmap being associated with the old value, and
  ii) generating a second change entry specifying a change to a second bitmap in the bitmapped index, the second bitmap being associated with the new value;

b) when the first bitmap is read from the bitmapped index, applying the change specified in the first change entry to the first bitmap causing the first bitmap to reflect the change of the old value to the new value; and c) when the second bitmap is read from the bitmapped index, applying the change specified in the second change entry to the second bitmap causing the second bitmap to reflect the change of the old value to the new value.

6. The method of claim 5, wherein the step of generating a first change entry further comprises the step of generating a first differential entry specifying a bit in the first bitmap to be flipped, and wherein the step of generating a second change entry further comprises the step of generating a second differential entry specifying a bit in the second bitmap to be flipped.

7. The method of claim 6, wherein the step of applying the change to the first bitmap further comprises the step of flipping the bit in the first bitmap specified in the first differential entry, and wherein the step of applying the change to the second bitmap further comprises the step of flipping the bit in the second bitmap specified in the second differential entry.

8. The method of claim 5, further comprising the step of storing the first and second change entries in the bitmapped

11 index, the first and second change entries being stored with a key value identical to the key value of bitmapped index entries with which the first and second change entries are associated.

9. The method of claim 8, further comprising the step of if existing change entries specifying the same changes as the first and second change entries already exist in the bitmapped index, then deleting the first and second change entries and deleting the existing change entries specifying the same changes as the first and second change entries.

10. The method of claim 5, wherein the step of generating a first change entry further comprises the step of generating flag information to distinguish the first change entry from other index entries in the bitmapped index, and wherein the step of generating a second change entry further comprises the step of generating flag information to distinguish the second change entry from other index entries in the bitmapped index.

11. The method of claim 5, further comprising the steps of:

a) applying the changes specified in the first and second change entries to the first and second bitmaps respectively, b) saving the changed first and second bitmaps, and c) deleting the first and second change entries.

12. A computer-readable medium having stored thereon a plurality of sequences of instructions, the plurality of sequences of instructions including sequences of instructions which, when executed by one or more processors, cause the one or more processors to perform the steps of:

a) generating a change entry identifying a bitmap change which, when applied to a bitmap contained in the bitmapped index, causes the bitmap to reflect the change made to the data; and b) saving the change entry.

13. The computer-readable medium of claim 12, wherein the computer-readable medium further includes instructions for storing the change entry as an index entry in the bitmapped index.

14. The computer-readable medium of claim 12, wherein the computer-readable medium further includes instructions for a) when a first bitmap associated with the prior value of the changed data is read from the bitmapped index, applying the bitmap change to the first bitmap causing the first bitmap to reflect the change made to the data, and b) when a second bitmap associated with the new value of the changed data is read from the bitmapped index, applying the bitmap change to the second bitmap causing the second bitmap to reflect the change made to the data.

15. The computer-readable medium of claim 14, wherein the instructions for applying the bitmap change to the first bitmap further comprise instructions for flipping a bit in the first bitmap specified in the bitmap change causing the first bitmap to indicate that the changed data no longer contains the value associated with the first bitmap, and wherein the instructions for applying the bitmap change to the second bitmap further include instructions for flipping a bit in the second bitmap specified in the bitmap change causing the second bitmap to indicate that the changed data contains the value associated with the second bitmap.

16. The computer-readable medium of claim 12, wherein the computer-readable medium further includes instructions for

12 a) when the old value is changed to the new value i) generating a first change entry specifying a change to a first bitmap in the bitmapped index, the first bitmap being associated with the old value, and ii) generating a second change entry specifying a change to a second bitmap in the bitmapped index, the second bitmap being associated with the new value, b) when the first bitmap is read from the bitmapped index, applying the change specified in the first change entry to the first bitmap causing the first bitmap to reflect the change of the old value to the new value, and c) when the second bitmap is read from the bitmapped index, applying the change specified in the second change entry to the second bitmap causing the second bitmap to reflect the change of the old value to the new value.

17. The computer-readable medium of claim 16, wherein the instructions for generating a first change entry further include instructions for generating a first differential entry specifying a bit in the first bitmap to be flipped, and wherein the instructions for generating a second change entry further include instructions for generating a second differential entry specifying a bit in the second bitmap to be flipped.

18. The computer-readable medium of claim 17, wherein the instructions for applying the change to the first bitmap further include instructions for flipping the bit in the first bitmap specified in the first differential entry, and wherein the instructions for applying the change to the second bitmap further include instructions for flipping the bit in the second bitmap specified in the second differential entry.

19. The computer-readable medium of claim 16, wherein the computer-readable medium further includes instructions for storing the first and second change entries in the bitmapped index, the first and second change entries being stored with a key value identical to the key value of bitmapped index entries with which the first and second change entries are associated.

20. The computer-readable medium of claim 19, wherein the computer-readable medium further includes instructions for if existing change entries specifying the same changes as the first and second change entries already exist in the bitmapped index, then deleting the first and second change entries and deleting the existing change entries specifying the same changes as the first and second change entries.

21. The computer-readable medium of claim 16, wherein the instructions for generating a first change entry further include instructions for generating flag information to distinguish the first change entry from other index entries in the bitmapped index, and wherein the instructions for generating a second change entry further include instructions for generating flag information to distinguish the second change entry from other index entries in the bitmapped index.

22. The computer-readable medium of claim 16, wherein the computer-readable medium further includes instructions for a) applying the changes specified in the first and second change entries to the first and second bitmaps respectively, b) saving the changed first and second bitmaps, and c) deleting the first and second change entries.

23. A computer system having a storage medium with an index stored thereon, the index comprising:

a) a first set of index entries of a first type; and b) a second set of index entries of a second type, the second set of index entries specifying changes to the first set of index entries to make the first set of index entries reflect changes made to data upon which the index is based.

24. The computer system of claim 23, wherein the index is a bitmapped index, wherein the bitmapped index is built on a key contained in a plurality of records contained in the data, and wherein each of the first set of index entries contains bitmap information, and wherein each of the second set of index entries specifies at least one change to the bitmap information contained in at least one of the first set of index entries causing the bitmap information in the first set of index entries to reflect changes made to the plurality of records.

25. The computer system of claim 24, wherein the bitmap information includes a string of bits, each bit corresponding to one of said plurality of records, and wherein the at least one change to the bitmap information contained in the at least one of the first set of index entries includes a change to a bit in the string of bits.

26. The computer system of claim 23, wherein a) the index is a bitmapped index built on a data table, b) each index entry in the first set of index entries contains a key value and a bitmap, the bitmap containing a string of bits where each bit indicates whether a corresponding data record in the data table contains the key value in the index entry, and c) each index entry in the second set of index entries includes a key value and a bit identifier, the bit identifier specifying a bit in the bitmap of one of the index entries in the first set of index entries having the same key value, which when the bit is changed, causes the index entry in the first set of index entries to reflect the change made to the data table.

27. The computer system of claim 26, wherein each index entry in the first set of index entries further includes a starting record identifier and an ending record identifier for mapping each index entry in the first set of index entries to one of the data records in the data table, and wherein each index entry in the second set of index entries further includes an entry identifier for identifying each of the index entries in the second set of entries.

* * * * *